United States Patent
Tuck et al.

(10) Patent No.: US 9,880,846 B2
(45) Date of Patent: Jan. 30, 2018

(54) IMPROVING HIT RATE OF CODE TRANSLATION REDIRECTION TABLE WITH REPLACEMENT STRATEGY BASED ON USAGE HISTORY TABLE OF EVICTED ENTRIES

(75) Inventors: Nathan Tuck, Corvallis, OR (US); Ross Segelken, Portland, OR (US)

(73) Assignee: NVIDIA CORPORATION, Santa Clara, CA (US)

( * ) Notice: Subject to any disclaimer, the term of this patent is extended or adjusted under 35 U.S.C. 154(b) by 730 days.

(21) Appl. No.: 13/444,673

(22) Filed: Apr. 11, 2012

(65) Prior Publication Data

US 2013/0275684 A1 Oct. 17, 2013

(51) Int. Cl.
G06F 9/455 (2006.01)
G06F 9/38 (2006.01)
G06F 9/30 (2006.01)

(52) U.S. Cl.
CPC .......... *G06F 9/3808* (2013.01); *G06F 9/3017* (2013.01); *G06F 9/30174* (2013.01); *G06F 9/4552* (2013.01)

(58) Field of Classification Search
CPC ... G06F 9/3808; G06F 9/30174; G06F 9/4552
See application file for complete search history.

(56) References Cited

U.S. PATENT DOCUMENTS

| | | |
|---|---|---|
| 3,815,101 A | 6/1974 | Boss et al. |
| 3,950,729 A | 4/1976 | Fletcher et al. |
| 4,654,790 A | 3/1987 | Woffinden |
| 4,797,814 A | 1/1989 | Brenza |
| 4,812,981 A | 3/1989 | Chan et al. |
| 5,123,094 A | 6/1992 | MacDougall |
| 5,179,669 A | 1/1993 | Peters |
| 5,245,702 A | 9/1993 | McIntyre et al. |
| 5,278,962 A | 1/1994 | Masuda et al. |
| 5,414,824 A | 5/1995 | Grochowski |
| 5,446,854 A | 8/1995 | Khalidi et al. |

(Continued)

FOREIGN PATENT DOCUMENTS

| | | |
|---|---|---|
| CN | 1390329 | 1/2003 |
| CN | 1519728 | 8/2004 |

(Continued)

OTHER PUBLICATIONS

Harper et al., (Rapid recovery from transient Faults in the fault tolerant processor with fault-tolerant shared memory) IEEE, p. 350-359.

(Continued)

*Primary Examiner* — Kenneth Kim (57) ABSTRACT

In one embodiment, a micro-processing system includes a hardware structure disposed on a processor core. The hardware structure includes a plurality of entries, each of which are associated with portion of code and a translation of that code which can be executed to achieve substantially equivalent functionality. The hardware structure includes a redirection array that enables, when referenced, execution to be redirected from a portion of code to its counterpart translation. The entries enabling such redirection are maintained within or evicted from the hardware structure based on usage information for the entries.

20 Claims, 4 Drawing Sheets

(56) References Cited

U.S. PATENT DOCUMENTS

| | | |
|---|---|---|
| 5,487,146 A | 1/1996 | Guttag et al. |
| 5,526,504 A | 6/1996 | Hsu et al. |
| 5,649,102 A | 7/1997 | Yamauchi et al. |
| 5,649,184 A | 7/1997 | Hayashi et al. |
| 5,696,925 A | 12/1997 | Koh |
| 5,721,855 A | 2/1998 | Hinton et al. |
| 5,870,582 A | 2/1999 | Cheong et al. |
| 5,949,785 A | 9/1999 | Beasley |
| 5,956,753 A | 9/1999 | Glew et al. |
| 5,963,984 A | 10/1999 | Garibay, Jr. et al. |
| 5,999,189 A | 12/1999 | Kajiya et al. |
| 6,012,132 A | 1/2000 | Yamada et al. |
| 6,031,992 A | 2/2000 | Cmelik et al. |
| 6,091,897 A * | 7/2000 | Yates et al. .................. 717/138 |
| 6,118,724 A | 9/2000 | Higginbottom |
| 6,297,832 B1 | 10/2001 | Mizuyabu et al. |
| 6,298,390 B1 | 10/2001 | Matena et al. |
| 6,362,826 B1 | 3/2002 | Doyle et al. |
| 6,457,115 B1 | 9/2002 | McGrath |
| 6,470,428 B1 | 10/2002 | Milway et al. |
| 6,499,090 B1 | 12/2002 | Hill et al. |
| 6,519,694 B2 | 2/2003 | Harris |
| 6,549,997 B2 | 4/2003 | Kalyanasundharam |
| 6,636,223 B1 | 10/2003 | Morein |
| 6,658,538 B2 | 12/2003 | Arimilli et al. |
| 6,711,667 B1 | 3/2004 | Ireton |
| 6,714,904 B1 | 3/2004 | Torvalds et al. |
| 6,742,104 B2 | 5/2004 | Chauvel et al. |
| 6,751,583 B1 | 6/2004 | Clarke et al. |
| 6,813,699 B1 | 11/2004 | Belgard |
| 6,823,433 B1 | 11/2004 | Barnes et al. |
| 6,839,813 B2 | 1/2005 | Chauvel |
| 6,859,208 B1 | 2/2005 | White |
| 6,877,077 B2 | 4/2005 | McGee et al. |
| 6,883,079 B1 | 4/2005 | Priborsky |
| 6,950,925 B1 | 9/2005 | Sander et al. |
| 6,978,462 B1 | 12/2005 | Adler et al. |
| 6,981,083 B2 | 12/2005 | Arimilli et al. |
| 7,007,075 B1 | 2/2006 | Coffey |
| 7,010,648 B2 | 3/2006 | Kadambi et al. |
| 7,062,631 B1 | 6/2006 | Klaiber et al. |
| 7,082,508 B2 | 7/2006 | Khan et al. |
| 7,107,411 B2 | 9/2006 | Burton et al. |
| 7,107,441 B2 | 9/2006 | Zimmer et al. |
| 7,117,330 B1 | 10/2006 | Alverson et al. |
| 7,120,715 B2 | 10/2006 | Chauvel et al. |
| 7,124,327 B2 | 10/2006 | Bennett et al. |
| 7,139,876 B2 | 11/2006 | Hooker |
| 7,159,095 B2 | 1/2007 | Dale et al. |
| 7,162,612 B2 | 1/2007 | Henry et al. |
| 7,191,349 B2 | 3/2007 | Kaushik et al. |
| 7,194,597 B2 | 3/2007 | Willis et al. |
| 7,194,604 B2 | 3/2007 | Bigelow et al. |
| 7,203,932 B1 * | 4/2007 | Gaudet et al. ............... 717/136 |
| 7,225,355 B2 | 5/2007 | Yamazaki et al. |
| 7,234,038 B1 | 6/2007 | Durrant |
| 7,275,246 B1 | 9/2007 | Yates, Jr. et al. |
| 7,310,722 B2 | 12/2007 | Moy et al. |
| 7,340,582 B2 | 3/2008 | Madukkarumukumana et al. |
| 7,340,628 B2 | 3/2008 | Pessolano |
| 7,401,358 B1 | 7/2008 | Christie et al. |
| 7,406,585 B2 | 7/2008 | Rose et al. |
| 7,447,869 B2 | 11/2008 | Kruger et al. |
| 7,519,781 B1 | 4/2009 | Wilt |
| 7,545,382 B1 | 6/2009 | Montrym et al. |
| 7,702,843 B1 | 4/2010 | Chen et al. |
| 7,730,489 B1 | 6/2010 | Duvur et al. |
| 7,752,627 B2 | 7/2010 | Jones et al. |
| 7,873,793 B1 | 1/2011 | Rozas et al. |
| 7,890,735 B2 | 2/2011 | Tran |
| 7,921,300 B2 | 4/2011 | Crispin et al. |
| 7,925,923 B1 | 4/2011 | Hyster et al. |
| 8,035,648 B1 | 10/2011 | Wloka et al. |
| 8,190,863 B2 | 5/2012 | Fossum et al. |
| 8,364,902 B2 | 1/2013 | Hooker et al. |
| 8,533,437 B2 | 9/2013 | Henry et al. |
| 8,549,504 B2 | 10/2013 | Breternitz, Jr. et al. |
| 8,621,120 B2 | 12/2013 | Bender et al. |
| 8,706,975 B1 | 4/2014 | Glasco et al. |
| 8,707,011 B1 | 4/2014 | Glasco et al. |
| 8,762,127 B2 | 6/2014 | Winkel et al. |
| 9,384,001 B2 | 7/2016 | Hertzberg et al. |
| 9,547,602 B2 | 1/2017 | Klaiber et al. |
| 2001/0049818 A1 | 12/2001 | Banerjia et al. |
| 2002/0004823 A1 | 1/2002 | Anderson et al. |
| 2002/0013889 A1 | 1/2002 | Schuster et al. |
| 2002/0099930 A1 | 7/2002 | Sakamoto et al. |
| 2002/0108103 A1 | 8/2002 | Nevill |
| 2002/0169938 A1 | 11/2002 | Scott et al. |
| 2002/0172199 A1 | 11/2002 | Scott et al. |
| 2003/0014609 A1 | 1/2003 | Kissell |
| 2003/0018685 A1 | 1/2003 | Kalafatis et al. |
| 2003/0033507 A1 | 2/2003 | McGrath |
| 2003/0120892 A1 | 6/2003 | Hum et al. |
| 2003/0140245 A1 | 7/2003 | Dahan et al. |
| 2003/0167420 A1 | 9/2003 | Parsons |
| 2003/0172220 A1 | 9/2003 | Hao |
| 2003/0196066 A1 | 10/2003 | Mathews |
| 2003/0236771 A1 | 12/2003 | Becker |
| 2004/0025161 A1 | 2/2004 | Chauvel et al. |
| 2004/0054833 A1 | 3/2004 | Seal et al. |
| 2004/0078778 A1 | 4/2004 | Leymann et al. |
| 2004/0122800 A1 * | 6/2004 | Nair et al. .................. 707/2 |
| 2004/0128448 A1 | 7/2004 | Stark et al. |
| 2004/0153350 A1 | 8/2004 | Kim et al. |
| 2004/0168042 A1 | 8/2004 | Lin |
| 2004/0193831 A1 | 9/2004 | Moyer |
| 2004/0215918 A1 | 10/2004 | Jacobs et al. |
| 2004/0225869 A1 | 11/2004 | Pagni et al. |
| 2004/0268071 A1 | 12/2004 | Khan et al. |
| 2005/0050013 A1 | 3/2005 | Ferlitsch |
| 2005/0055533 A1 | 3/2005 | Kadambi et al. |
| 2005/0086650 A1 | 4/2005 | Yates, Jr. et al. |
| 2005/0097276 A1 | 5/2005 | Lu et al. |
| 2005/0097280 A1 | 5/2005 | Hofstee et al. |
| 2005/0138332 A1 | 6/2005 | Kottapalli et al. |
| 2005/0154831 A1 | 7/2005 | Steely, Jr. et al. |
| 2005/0154867 A1 | 7/2005 | DeWitt, Jr. et al. |
| 2005/0207257 A1 | 9/2005 | Skidmore |
| 2005/0268067 A1 | 12/2005 | Lee et al. |
| 2006/0004984 A1 | 1/2006 | Morris et al. |
| 2006/0010309 A1 | 1/2006 | Chaudhry et al. |
| 2006/0069879 A1 | 3/2006 | Inoue et al. |
| 2006/0069899 A1 | 3/2006 | Schoinas et al. |
| 2006/0095678 A1 | 5/2006 | Bigelow et al. |
| 2006/0149931 A1 | 7/2006 | Haitham et al. |
| 2006/0174228 A1 | 8/2006 | Radhakrishnan et al. |
| 2006/0187945 A1 | 8/2006 | Andersen |
| 2006/0190671 A1 | 8/2006 | Jeddeloh |
| 2006/0195683 A1 | 8/2006 | Kissell |
| 2006/0230223 A1 | 10/2006 | Kruger et al. |
| 2006/0259732 A1 | 11/2006 | Traut et al. |
| 2006/0259744 A1 | 11/2006 | Matthes |
| 2006/0259825 A1 | 11/2006 | Cruickshank et al. |
| 2006/0277398 A1 | 12/2006 | Akkary et al. |
| 2006/0282645 A1 | 12/2006 | Tsien |
| 2006/0288174 A1 | 12/2006 | Nace et al. |
| 2007/0067505 A1 | 3/2007 | Kaniyur et al. |
| 2007/0073996 A1 | 3/2007 | Kruger et al. |
| 2007/0106874 A1 | 5/2007 | Pan et al. |
| 2007/0126756 A1 | 6/2007 | Glasco et al. |
| 2007/0157001 A1 | 7/2007 | Ritzau |
| 2007/0168634 A1 | 7/2007 | Morishita et al. |
| 2007/0168643 A1 | 7/2007 | Hummel et al. |
| 2007/0204137 A1 | 8/2007 | Tran |
| 2007/0234358 A1 | 10/2007 | Hattori et al. |
| 2007/0240141 A1 | 10/2007 | Qin et al. |
| 2008/0141011 A1 | 6/2008 | Zhang et al. |
| 2008/0172657 A1 | 7/2008 | Bensal et al. |
| 2008/0263284 A1 | 10/2008 | da Silva et al. |
| 2009/0019317 A1 | 1/2009 | Quach et al. |
| 2009/0204785 A1 | 8/2009 | Yates, Jr. et al. |
| 2009/0327661 A1 | 12/2009 | Sperber et al. |
| 2009/0327673 A1 | 12/2009 | Yoshimatsu et al. |

(56) References Cited

U.S. PATENT DOCUMENTS

| | | | |
|---|---|---|---|
| 2010/0161901 | A9 | 6/2010 | Williamson et al. |
| 2010/0205402 | A1 | 8/2010 | Henry et al. |
| 2010/0205415 | A1 | 8/2010 | Henry et al. |
| 2010/0217936 | A1 | 8/2010 | Carmichael et al. |
| 2010/0306503 | A1 | 12/2010 | Henry et al. |
| 2011/0078425 | A1 | 3/2011 | Shah et al. |
| 2011/0153307 | A1* | 6/2011 | Winkel et al. .................. 703/26 |
| 2011/0307876 | A1 | 12/2011 | Ottoni et al. |
| 2012/0023359 | A1 | 1/2012 | Edmeades et al. |
| 2012/0089819 | A1 | 4/2012 | Chaudhry et al. |
| 2012/0198157 | A1 | 8/2012 | Abdallah |
| 2013/0198458 | A1 | 8/2013 | Winkel et al. |
| 2013/0219370 | A1 | 8/2013 | Beale et al. |
| 2013/0246709 | A1 | 9/2013 | Segelken et al. |
| 2013/0275684 | A1 | 10/2013 | Tuck et al. |
| 2013/0311752 | A1 | 11/2013 | Brauch et al. |
| 2014/0019723 | A1 | 1/2014 | Yamada et al. |
| 2014/0052962 | A1 | 2/2014 | Hertzberg et al. |
| 2014/0082291 | A1 | 3/2014 | Van Zoeren et al. |
| 2014/0136891 | A1 | 5/2014 | Holmer et al. |
| 2014/0189310 | A1 | 7/2014 | Tuck et al. |
| 2014/0281259 | A1 | 9/2014 | Klaiber et al. |
| 2014/0281392 | A1 | 9/2014 | Tuck et al. |
| 2015/0026443 | A1 | 1/2015 | Kumar et al. |

FOREIGN PATENT DOCUMENTS

| | | |
|---|---|---|
| CN | 1629799 | 6/2005 |
| CN | 1682181 | 10/2005 |
| CN | 1823322 | 8/2006 |
| CN | 1831757 | 9/2006 |
| CN | 101042670 | 9/2007 |
| CN | 101110074 | 1/2008 |
| CN | 100378618 C | 4/2008 |
| CN | 102110011 | 6/2011 |
| CN | 101984403 | 6/2014 |
| DE | 10 2013 218 370 | 3/2014 |
| EP | 0671718 | 9/1995 |
| EP | 1557754 A2 | 7/2005 |
| GB | 2287111 | 9/1995 |
| GB | 2404043 | 1/2005 |
| GB | 2404044 | 1/2005 |
| JP | 02288927 | 11/1990 |
| JP | 03054660 | 3/1991 |
| JP | 04182858 | 6/1992 |
| TW | 1233545 | 12/1992 |
| TW | 200401187 | 1/2004 |
| TW | 1232372 | 5/2005 |
| TW | 200537886 | 11/2005 |
| TW | 1263938 | 10/2006 |
| TW | 1275938 | 3/2007 |
| TW | 1282230 | 6/2007 |
| TW | 200723111 | 6/2007 |
| TW | 1284281 | 7/2007 |
| TW | 200809514 | 2/2008 |
| TW | 1309378 | 5/2009 |
| TW | 1315488 | 10/2009 |
| TW | 1315846 | 10/2009 |
| TW | 201106264 | 2/2011 |
| TW | 201135460 | 10/2011 |
| TW | 201220183 | 5/2012 |
| TW | 1425418 | 2/2014 |
| WO | 2012103209 | 8/2012 |

OTHER PUBLICATIONS

Wikipedia, (Page Fault definition), Wikipedia, Mar. 9, 2009, pp. 1-4.
Wikipedia, (CPU Cache definition), Wikipedia, Jan. 26, 2010, pp. 1-16.
Osronline, (The Basics: So what is a Page fault?), http://www.osronline.com/article.cfm?article=222, May 5, 2003, p. 1-2.
Chaudhuri, "The impact of NACKs in shared memory scientific applications", Feb. 2004, IEEE, IEEE Transactions on and distributed systems vol. 15, No. 2, p. 134-150.
Laibinis, "Formal Development of Reactive Fault Tolerant Systems", Sep. 9, 2005, Springer, Second International RISE 2005, p. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Guelfi et al., (Rapid Integration of Software Engineering Techniques) 2005, Second International Workshop, 9 pages.
Ooi, (Fault Tolerant Architecture in a cache memory control LSI), 1992, IEEE, 507-514.
Oracle, (Oracle 8i Parallel server), 1999, Oracle, Release 2 (8.1.6) 1-216.
Shalan. (Dynamic Memory Management for embedded real-time multiprocessor system on a chip), 2000, ACM. 180-186.
Shalan. (Dynamic Memory Management for embedded real-time multiprocessor system on a chip), 2003, Georgia Inst. of Tech. 1-118.
Rotenberg et al., "Trace Cache: a Low Latency Approach to High Bandwidth Instruction Fetching," Proceedings of he 29th Annual International Symposium on Microarchitecture, Dec. 2-4, 1996, Paris, France, IEEE, 12 pages.
Rotenberg et al., "A Trace Cache Microarchitecture and Evaluation," IEEE Transactions on Computers, vol. 48, No. 2, Feb. 1999, 10 pages.
Rotenberg et al., "Trace Cache: a Low Latency Approach to High Bandwidth Instruction Fetching," <http://people.engr.ncsu.edu/ericro/publications/techreport_MICRO-29_rbs.pdf>, Apr. 11, 1996, 48 pages.
PC Magazine (Definition of: Page Fault) PCMag.com, Mar. 27, 2009.
Adve, S. et al., "Shared Memory Consistency Models: A Turorial", WRL Research Report 95/7, Western Digital Laboratory, Sep. 1995, 32 pages.
Chaudry, S. et al., "High-Performance Throughput Computing," Micro, IEEE 25.3, pp. 32-45, May, 2005, 14 pages.
Dehnert et al., "The Transmeta Code MorphingTM Software: Using Speculation, Recovery, and Adaptive Retranslation to Address Real-Life Challenges," Mar. 23, 2003, IEEE, CGO '03 Proceedings of the international symposium on Code generation and optimization: feedback-directed and runtime optimization, pp. 15-24.
Dundas, J. et al., "Improving Data Cache Performance by Pre-executing Instructions Under a Cache Miss," Proceedings of the 1997 International Conference on Supercomputing, Jul. 1997, 8 pages.
Ekman, M. et al., "Instruction Categorization for Runahead Operation", U.S. Appl. No. 13/708,544, Filed Dec. 7, 2012, 32 pages.
Ekman, M. et al., "Selective Poisoning of Data During Runahead", U.S. Appl. No. 13/662,171, Filed Oct. 26, 2012, 33 pages.
Holmer, B., et al., "Managing Potentially Invalid Results During Runahead", U.S. Appl. No. 13/677,085, =Filed Nov. 14, 2012, 29 pages.
Intel Itanium Architecture Software Developer's Manual, Intel, http://www.intel.com/design/itanium/manuals/iiasdmanual.htm, 1 page, Mar. 8, 2013.
Mutlu, O. et al. "Runahead Execution: An Alternative to Very large Instruction Windows for Out-of-order Processors," Proceedings of the Ninth International Symposium on High-Performance Computer Architecture, Feb. 8-12, 2002, IEEE, 12 pages.
Rozas' Guillermo J. et al., "Lazy Runahead Operation for a Microprocessor", U.S. Appl. No. 13/708,645, Filed Dec. 7, 2012, 32 pages.
Rozas, Guillermo J. et al., "Queued Instruction Re-Dispatch After Runahead," U.S. Appl. No. 13/730,407, Filed Dec. 28, 2012, 36 pages.
Wikipedia article, "Instruction Prefetch," https://en.wikipedia.org/wiki/Instruction_prefetch, downloaded May 23, 2016.
Wikipedia article, "x86," https://en.wikipedia.org/wiki/X86, downloaded May 23, 2016.

* cited by examiner

IMPROVING HIT RATE OF CODE TRANSLATION REDIRECTION TABLE WITH REPLACEMENT STRATEGY BASED ON USAGE HISTORY TABLE OF EVICTED ENTRIES

BACKGROUND

Modern microprocessors employ a wide variety of strategies to improve processing and execution. One category of improvements involves translating instructions of a given instruction set architecture (ISA). Translated versions of ISA code can offer various performance benefits relative to the non-translated ISA instructions when executed by the microprocessor. In some cases, systems with translations are inefficient in the way that they provide the processing pipeline with access to translated code. For example, some systems may persist in a state in which valuable, frequently-executed translations are relatively more difficult to access than translations providing lesser benefits.

DETAILED DESCRIPTION

The present disclosure provides a mechanism for efficiently managing the retrieval and execution of translations of corresponding code portions, such as target ISA code portions. The intelligent generation of translations, and the optimization thereof, may be handled by a dynamic binary translator, which may be included as part of a software layer that provides an interface between an ISA and the processor core. The disclosure further describes a multiplexed processing pipeline, in which the microprocessor uses an on-core hardware structure to efficiently retrieve and execute translated versions of corresponding ISA code. The hardware structure may also be variously referred to herein as the "hardware redirector."

The translations, when accessed via the hardware redirector, are executed in lieu of the corresponding code and provide substantially equivalent functionality. Once retrieved, these translations may be executed in the processing pipeline without using the microprocessor's hardware decoder. When this disclosure refers to execution "without using the hardware decoder," that language may still encompass minor or trivial uses of the hardware decoder while a translation is being executed. Alternatively, if a translation has not been created or is not accessible, target code may be received into and processed by a hardware decoder to generate instructions native to and executable by execution logic/mechanisms of the microprocessor. The described execution of a translation without the hardware decoder will be referred to herein as a "translation mode" of execution, in contrast to the "hardware decoder mode" described above, in which full hardware decoder functionality is used to decode target ISA instructions into native instructions. Circumventing the hardware decoder (i.e., by executing a translation) in many cases will improve speed of execution, reduce power consumption, and provide various other benefits.

Although various references to a "multiplexed" processing pipeline are described herein, it will be understood that the term refers to the processing pipeline being configured to alternately provide (e.g., multiplex) multiple operating modes (e.g., translation mode vs. hardware decoder mode). As such, it will be further understood that the pipeline may employ logic instead of, or in addition to, multiplexing logic in order to provide the features described herein.

Over time, translations that are frequently and/or recently requested are indexed by, and incorporated into, the hardware redirector provided on the processor core. Each entry in the hardware redirector is associated with a translation, and provides redirection information that enables the microprocessor, during a fetch operation for a selected code portion, to cause execution to be redirected away from that code portion and to its associated translation. If a code portion has an entry in the hardware structure (a "hit"), the associated translation is executed in the translation mode (i.e., without the hardware decoder). If the reference to the hardware structure "misses" (i.e., there is no entry for the code portion), then the code portion is executed in the hardware decoder mode using the hardware decoder.

Over time, the micro-processing system may generate a large number of translations. In order to save on processor die area and to provide rapid lookups, the hardware redirector may be of limited size. It is therefore desirable that it be populated with entries providing redirection for the most "valuable" translations, such as translations that are more frequently and/or recently used. In other words, it is typically desirable that references to the hardware redirector have as high a hit rate as possible.

To maximize hit rates and provide efficient and quick access to valuable translations, the hardware redirector includes usage information associated with the entries that are present in the structure. This usage information varies in response to entries in the hardware structure being used to redirect execution. Maximizing hit rates may be achieved by maintaining or evicting entries from the hardware structure based on this usage information.

Depending on the overall design of the system, a miss on the hardware redirector can mean (1) that a translation has not been generated for a particular code portion; or (2) that a translation has been generated, but is not accessible via interaction with the hardware redirector. The scenario of (2) may result, for example, in the case of a translation that is "less available" due to it being used less frequently and/or less recently than other translations. In this example, and as described throughout, the population of entries in the hardware redirector is dynamically and intelligently controlled to maximize hit rate of the hardware redirector.

Figure 1:
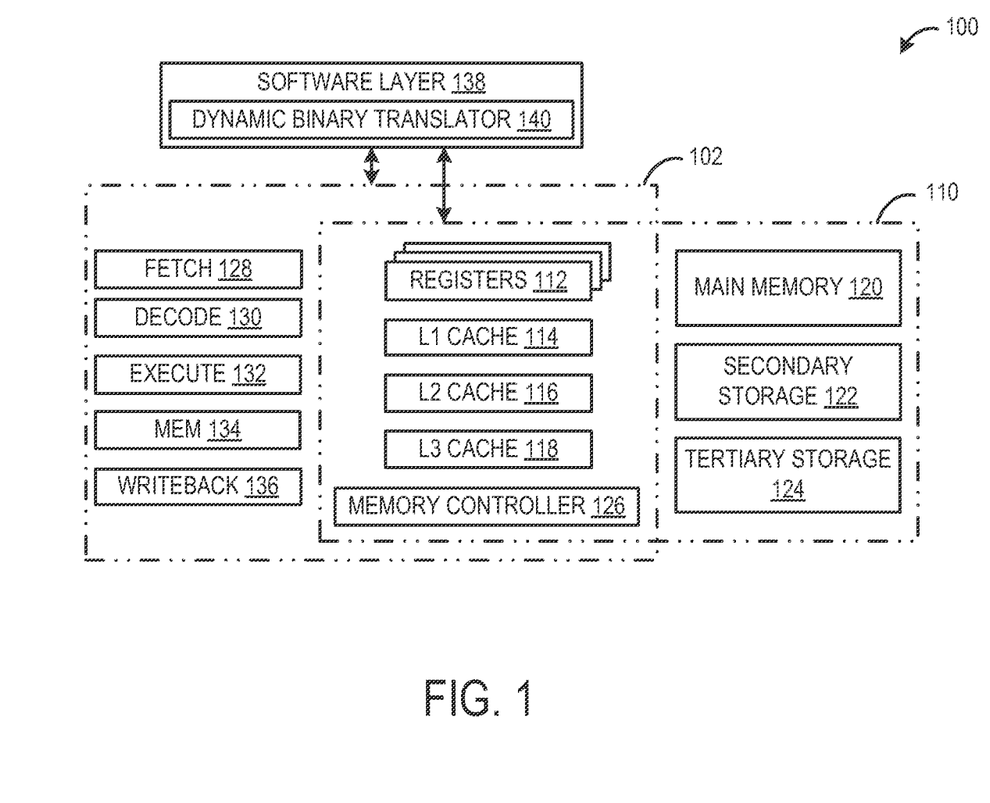
FIG. 1 shows a micro-processing system according to an embodiment of the present disclosure.

FIG. 1 schematically depicts a micro-processing system 100 including a microprocessor/core 102 and associated software and memory system that may be employed in connection with the systems and methods described herein. In particular, the depicted system may be implemented to efficiently make use of the multiplexing strategy described above, and that will be further described below in connection with various examples.

Microprocessor 102 variously includes and/or may communicate with various memory and storage locations 110, which may include processor registers 112, an L1 processor cache 114, an L2 processor cache 116, an L3 processor cache 118, main memory 120 (e.g., one or more DRAM chips), secondary storage 122 (e.g., magnetic and/or optical storage units) and/or tertiary storage 124 (e.g., a tape farm). Some or all of these locations may be memory-mapped, though in some implementations the processor registers may be mapped differently than the other locations, or may be implemented such that they are not memory-mapped. The L1-L3 caches may or may not be on the processor die/core, though in many cases at least the L1 cache will be on the processor core. It will be understood that the memory/storage components are listed above in increasing order of access time and capacity, though there are possible exceptions. A memory controller 126 may be used to handle the protocol and provide the signal interface required of main memory 120, and, typically, to schedule memory accesses. The memory controller can be implemented on the processor die or on a separate die. It is to be understood that the locations set forth above are non-limiting and that other memory/storage locations may be used without departing from the scope of this disclosure.

Microprocessor 102 is configured to execute instructions that generally are described and defined by an ISA that is native to the processor. In the present description, native instructions are generated in two different ways. The first way involves a hardware decoder receiving target ISA instructions and generating native instructions from those target ISA instructions. The second way is to generate an optimized native translation of target ISA instructions, typically via a dynamic binary translator (e.g., shown at 140). These translations provide substantially equivalent functionality, but they are optimized and are executed without the need of the hardware decoder.

Regardless of the particular ISA, the described multiplexing mechanism may be employed to efficiently retrieve and execute ISA code portions or corresponding translations of those code portions. Microprocessor 102 may be configured to execute various instruction set architectures, which may be characterized as complex instruction sets (CISC architecture), reduced instruction sets (RISC architecture), and/or VLIW architectures. Furthermore, it is possible that a given instruction set may have characteristics associated with more than one of these regimes. In addition, some instruction sets that are thought of as CISC implementations may in fact be executed on microprocessor 102 in a RISC-like fashion. For example, the widely employed x86 architecture, though considered a CISC system, is often implemented in a manner that is more associated with a pipelined RISC implementation. Again, regardless of the particular ISA or its characteristics, the present disclosure provides a way of efficiently utilizing translations of the ISA code portions.

Instantiation of code as a series of processor-recognized instructions (i.e., ISA instructions) may entail compiling code of an operating system, application, driver, etc. to produce binary code that is executed by microprocessor 102. During compilation or post-processing operations, VLIW-type techniques may be employed (e.g., in a software layer) to effect various optimizations. In some cases, these software optimizations are employed so that the microprocessor can execute instructions in program order without the need for the complex hazard detection and avoidance/mitigation hardware that are present in many CISC and RISC execution pipelines. That said, in some cases software and/or decode and execution hardware may be employed to perform dynamic optimization and hazard avoidance in lieu of, or in addition to, VLIW techniques.

The microprocessor further includes a processing pipeline which typically includes fetch logic 128, decode logic 130, execution logic 132, mem logic 134, and writeback logic 136. Fetch logic 128 retrieves instructions from one or more of locations 110 (but typically from either unified or dedicated L1 caches backed by L2-L3 caches and main memory).

Decode logic 130 decodes the instructions, for example, by parsing opcodes, operands, and addressing modes. Upon being parsed, the instructions are then executed by execution logic 132. As mentioned above and as will be described in greater detail below, processor 102 may be configured to, when in a translation mode, execute translations of target ISA instructions via execution logic 132 without first decoding such instructions with a hardware decoder such as decode logic 130.

For operations that produce a primary result (e.g., as opposed to those that perform a branch to another location in the executing program), writeback logic 136 writes the result to an appropriate location, such as a processor register. In load/store architectures, mem logic 134 performs load and store operations, such as loading an operand from main memory into a processor register.

It should be understood that the above five stages are somewhat specific to, and included in, a typical RISC implementation. More generally, a microprocessor may include fetch, decode, and execution logic, with mem and writeback functionality being carried out by the execution logic. The present disclosure is equally applicable to these and other microprocessor implementations.

In the described examples, instructions may be fetched and executed one at a time, possibly requiring multiple clock cycles. During this time, significant parts of the data path may be unused. In addition to, or instead of, single instruction fetching, pre-fetch methods may be used to improve performance and avoid latency bottlenecks associated with read and store operations (i.e., the reading of instructions and loading such instructions into processor registers and/or execution queues). In addition, the exemplary microprocessor may be pipelined to exploit instruction level parallelism and better utilize the data path so that there are multiple instructions in different stages of execution at the same time. Still further, fetch logic 128, decode logic 130, execution logic 132, etc., may be individually pipelined with multiple logic stages to improve performance.

Storage locations 110 may include a secure/private memory allocation accessible by microprocessor 102 during execution of native ISA instructions. This memory allocation may, for example, be used for execution of software layer 138 (FIG. 1) and storage of associated data. Of particular relevance to the present discussion is a library of translations that have been generated from corresponding blocks of target ISA code. These translations may vary in length and the extent to which they have been optimized.

Figure 2:
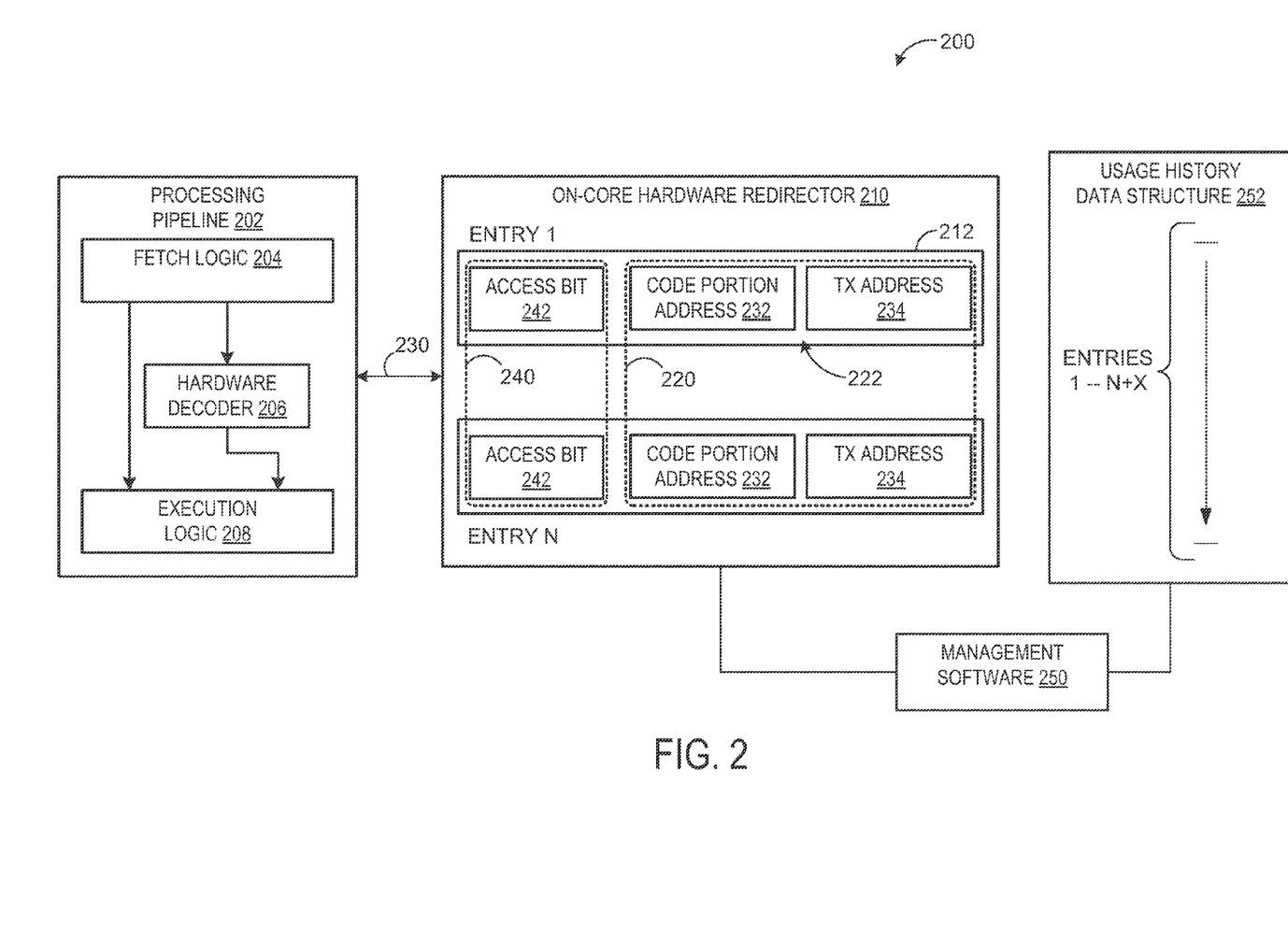
FIG. 2 schematically depicts a micro-processing system with an on-core hardware structure and related components that facilitate the redirection of execution from a code portion to a corresponding translation of that code portion which achieves substantially equivalent functionality. The figure further depicts maintaining or evicting redirection entries in the hardware structure based on their usage.

FIG. 2 shows an embodiment of a system 200 for selectively providing hardware decoder execution and dynamic binary translation execution via processing pipeline 202. The processing pipeline is shown in simplified form, and includes fetch logic 204, hardware decoder 206 and execution logic 208. System 200 includes an on-core hardware redirector 210 having a plurality of entries 212, each of which are associated with a translation of a corresponding code portion. The hardware redirector includes N entries in the present example, though it will be appreciated that it may have any practicable size.

Each translation referenced by the hardware redirector can be executed in lieu of its corresponding code portion to achieve substantially equivalent functionality. As previously described, the translated code may be intelligently generated via a software-based dynamic binary translator (e.g., dynamic binary translator 140 of FIG. 1), and may be optimized in various ways (e.g., using register renaming, loop transformations, reordering of operations, grouping and consolidation of instructions and micro-operations, etc.). These are non-limiting examples—code translations may be implemented in a variety of other ways.

The hardware redirector includes a redirection array 220 that includes, for each entry, redirection information 222 that the system can use to redirect execution from a selected code portion to its corresponding translation. Such information may be used, for example, during a fetch operation 230 performed by fetch logic 204.

In the depicted example, the redirection information is implemented as an address mapping between the address of a target ISA code portion (232) and the address of its corresponding translation (234). During the fetch operation, a lookup may be performed on redirection array 220. If the target ISA address being fetched is present in the array, the fetch operation proceeds using the address of the translation. This enables processing pipeline to redirect to the translation, and execute it in the execution logic without using the hardware decoder (i.e. in the translation mode of execution). Alternatively, if the address for the target ISA code portion is not present in the array, the code portion is executed in the hardware decoder mode using hardware decoder 206. In examples using address mapping, hashed forms of address may also be used in connection with the entries in the hardware redirector. Address mapping is but one example; this disclosure encompasses any suitable on-core hardware mechanism for enabling execution to be redirected to a translation from its corresponding code portion.

Hardware redirector 210 further includes an access array 240 that includes usage information that varies in response to entries 212 being used to redirect execution to translations. As described in more detail below, the depicted system uses the usage information to control whether specific entries are maintained within or evicted from the hardware redirector. The usage information may take various forms, though it is implemented in the present example as a per-entry access bit 242. The access bit is a binary indication of whether its associated entry in the hardware redirector has been used to redirect execution to a translation. In other examples, usage information may be encoded to cover multiple entries in the hardware redirector, instead of encoding information for individual entries.

System 200 further includes management software 250 which interacts with the hardware redirector and a usage history data structure 252. Among other things, the purpose of this interaction is to dynamically control the population of specific entries in the hardware redirector. The management software may repeatedly sample the usage information in access array 240, and may use those samples to store and analyze information relating to entries in the hardware redirector. The analysis is performed in order to determine whether specific entries are maintained or evicted from the hardware redirector. This may be performed, for example, based on how recently and/or frequently those entries have been used to redirect execution to a translation.

With respect to evicted entries, history information typically will be retained in usage history data structure 252, in addition to the currently active entries. As a result of subsequent analysis (e.g., by the depicted management software), evicted entries may at some point be re-inserted into the hardware redirector.

Indeed, FIG. 2 shows the storage of history information for entries that are not present in the hardware redirector. History data structure 252 has more entries than the hardware redirector (N+X>N), reflecting the typical situation where the system has generated more translations than there are slots in the hardware redirector. Translations provide faster and/or more efficient operation, however identifying and retrieving a given translation from a large lookup structure may offset any such benefits. For example, with a large number of translations, attempts to look up and retrieve translations using the target instruction pointer may be relatively slow. The numbering 1 through N in the hardware redirector and 1 through N+X in structure 252 is not intended to imply any sequence or contiguous ordering. It merely is an indication that usage information may be stored for a larger number of translations than there are entries in the hardware redirector.

Returning now to the specific example using access bits 242, the access bit for a particular entry may be set whenever the entry is used to redirect execution. Between times when it is set, the bit may be cleared by hardware or by management software 250. In one example, the management software repeatedly samples and clears the access bit for the entries in the hardware director. This may occur at regular intervals, such as every M clock cycles (e.g., every 1000 cycles) or in connection with some other recurring event (e.g., timer interrupt). The management software may then create a history of the value of the access bit over time and store that history in usage history data structure 252. This history may then be analyzed using a wide variety of methods, in order to increase the hit rate on hardware redirector 210. Again, the analysis performed by management software 250 will typically include assessment of how frequently and/or how recently entries have been used to redirect execution, which in turn is used to control whether specific entries are maintained in or evicted from the hardware redirector.

The systems herein may employ usage information other than access bits. Whether encoded in access array 240 or stored in various forms in usage history data structure 252, the usage information may include a count of how many times an entry has been used to redirect execution. For example, counters may be employed in hardware redirector 210 and/or usage history data structure for one or more of the entries. The usage information may further include identification of a time when an entry was used to redirect execution.

In FIG. 2, the management software is depicted separately from processing pipeline 202. However, this code may execute in various locations and/or be associated with various components depicted in FIGS. 1 and 2. In one example, the management code runs on processing pipeline 202, and accesses the hardware redirector and the usage history data structure depicted in FIG. 2.

Regardless of the particular configuration, providing redirection and usage information in a hardware structure can provide significant benefits. Queries to the hardware redirector can happen in the front end of the pipeline as the processor is fetching code along the main execution path. If redirection were instead implemented as a software structure, a subroutine would need to be called to perform lookup instead of directly continuing along the main execution path. The hardware redirector thus provides a mechanism for rapid and easy access to high-value translations.

Figure 3:
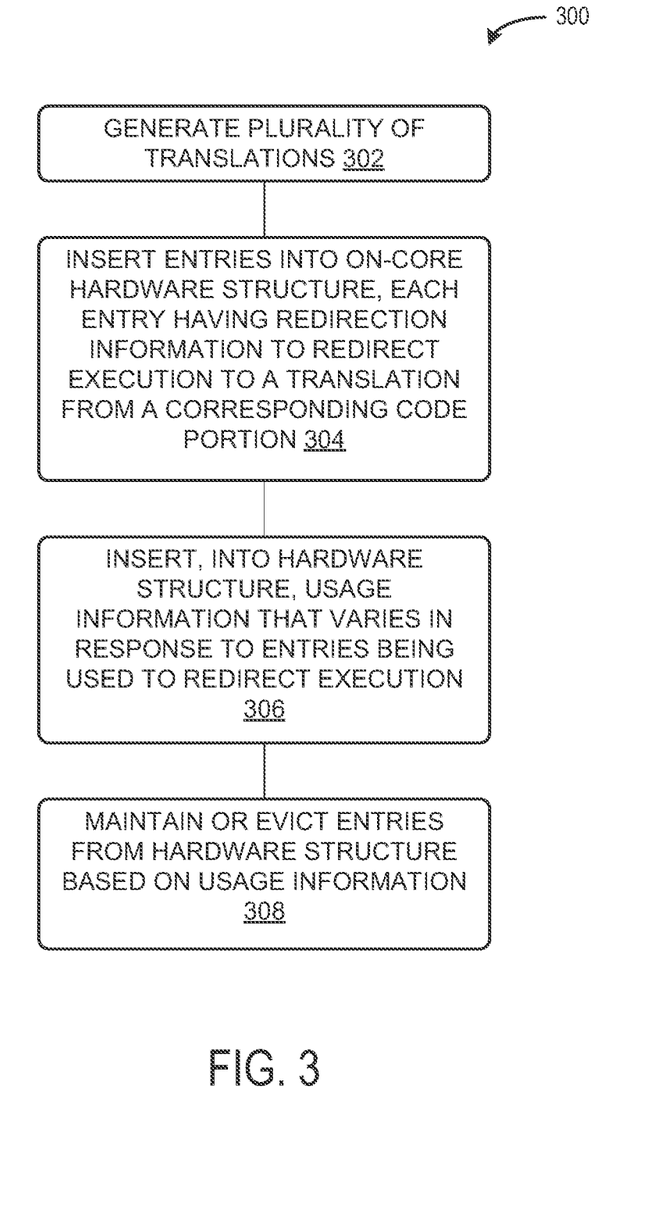
FIG. 3 shows an example process flow of a method, in a processing pipeline, for alternatively processing in a translation mode or in a hardware decoder mode.
Figure 4:
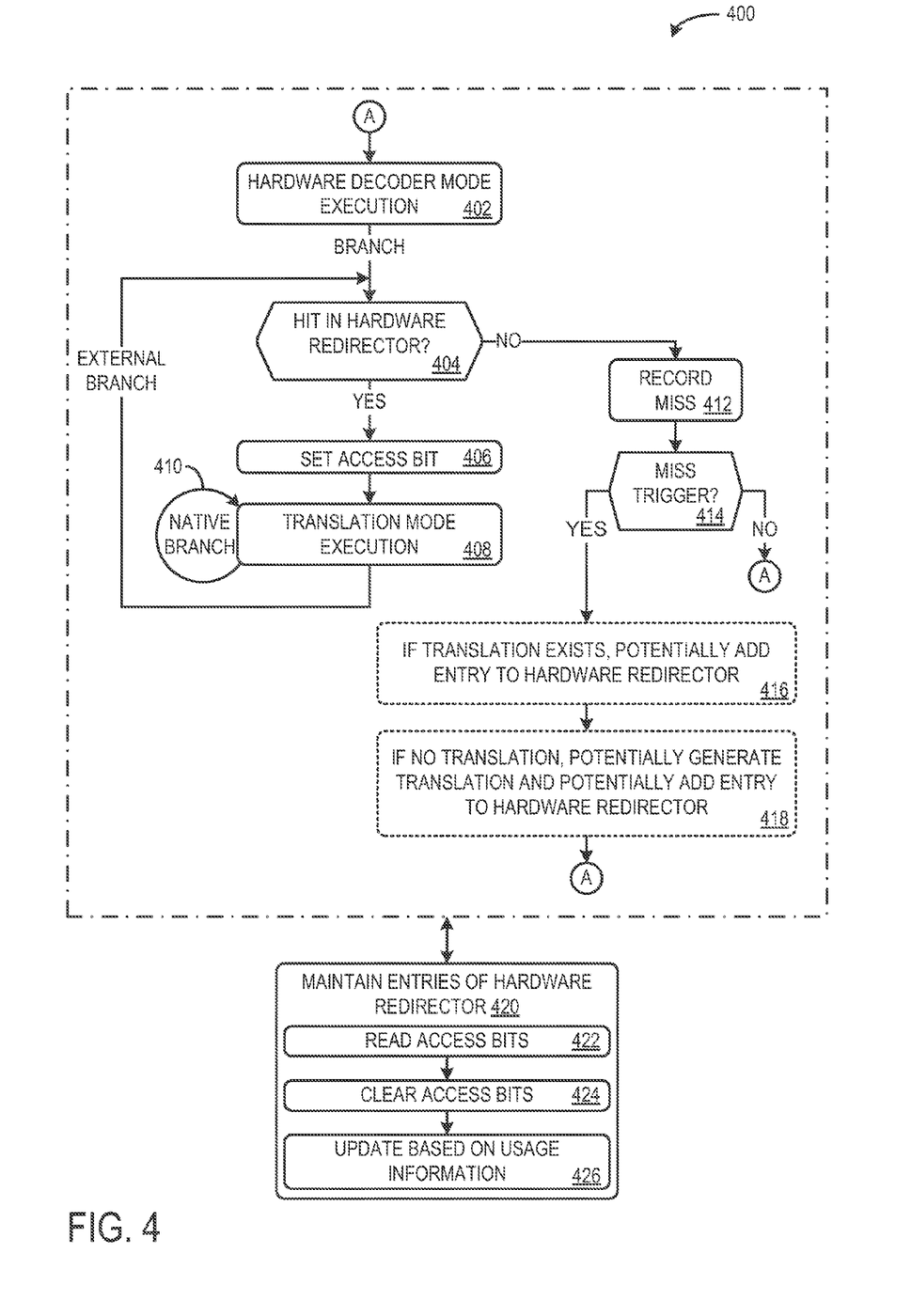
FIG. 4 shows another example process flow of a method, in a processing pipeline, for alternatively processing in a translation mode or in a hardware decoder mode.

Turning now to FIGS. 3 and 4, the figures show example methods and process flows in which hardware-accessible entries of redirection information are managed. The methods may be implemented with any suitable software/hardware, including configurations other than those shown in the foregoing examples. In some cases, however, the process flows may reference components and processes that have already been described. For purposes of clarity and minimizing repetition, it may be assumed that these components/processes are similar to the previously described examples.

FIG. 3 depicts an example method 300 of alternately processing in the previously described modes, i.e., a hardware decoder mode or a translation mode. At 302, the method includes generating a plurality of translations, using a dynamic binary translator or through another suitable method. At 304, the method includes populating an on-core hardware structure with a plurality of inserted entries. Each entry is associated with one of the translations generated at step 302, and includes redirection information that enables execution to be redirected from a non-translated code portion to its translated counterpart. Address mappings may be employed, as discussed above, however other methods can be employed to redirect execution to translations in lieu of their corresponding code portions.

At 306, the method includes inserting usage information into the hardware structure. The usage information varies in response to entries being used to redirect execution. Examples of suitable usage information include per-entry access bits; counts of how many times an entry is used to redirect execution; indication of time(s) when entries are used to redirect execution; etc. In some examples, the usage information is extracted from the hardware structure, and is stored in software and processed to control the population of entries referenced at 304.

Indeed, at 308, the method includes maintaining or evicting entries from the hardware structure based on the varying usage information of step 306. As described above, this may include controlling what entries are present in the hardware structure based on how frequently and/or how recently entries were used to redirect execution.

In examples with access bits, those bits may be repeatedly sampled and cleared in order to generate a history of access bit values over time. This history can then be analyzed to perform the maintenance/eviction shown at step 308.

The flowchart of FIG. 3 is not intended to imply that steps need to be performed in a particular sequence, though particular orderings may be desired in certain settings. In general, steps may be performed in sequences other than those shown in the figure, and in many cases steps will be performed in parallel.

FIG. 4 shows another example method 400 for alternatively processing in a translation mode or in a hardware decoder mode. This example method specifically includes use of access bits in a hardware redirector as previously described. At 402, method 400 includes executing target ISA instructions in a hardware decoder mode. In order to easily switch between code portions (i.e., target ISA portions and/or native ISA portions), the code portions may be separated at branch instructions. In other words, a first code portion may end at a branch instruction such that the targets of the branch instruction refer to the beginnings of other code portions. Accordingly, execution of target ISA instructions at 402 may continue until reaching such a branch instruction, and then continue on to 404. Instead of the branches in this example, any other suitable separation of code segments may be employed.

At 404, the method includes evaluating if a hit occurs in a hardware redirector, such as hardware redirector 210 of FIG. 2. The query to the hardware redirector may, in one example, be implemented by looking up an address associated with the branch target. In the event of a hit, method 400 continues to 406, where an access bit associated with the redirection entry.

At 408, the method includes executing the associated translation. Execution of the translation continues until: (1) a native branch 410 is reached, at which point another translation will be executed, or (2) an external branch (i.e., branch to a target ISA code portion) is reached, at which point processing returns to 404 for further query to the entries in the hardware redirector.

Referring again to 404, if there is not an entry in hardware redirector corresponding to the branch target, a miss may be recorded at 412. Misses may be associated with branch targets in order to identify frequently missed targets or targets that have been missed more than a threshold number of times. Specifically, at 414, method 400 includes evaluating if a miss trigger condition has occurred. Such a trigger may be determined via any appropriate mechanism using a variety of different criteria in addition to, or instead of, the frequency/threshold examples mentioned above. Steps 412 and 414 may be thought of as tracking usage of the hardware decoder, since a branch target miss will result in hardware decoder mode execution.

If the trigger condition is satisfied, the method may include, at 416, potentially adding an entry for the branch target into the hardware redirector if a translation exists. In one example, a native branch may then be used to continue to the translation mode execution shown at 408. If translation does not exist, however, method 400 may include, at 418, potentially generating a translation and adding an entry for that translation in the hardware redirector. Alternatively, the system could record that translation may be required or desirable, and processing could return to hardware decoder mode execution at 402 instead of creating the translation immediately.

As with the previous flowchart, it should be understood that the various steps in many cases may be performed in a sequence other than that implied by the figures. For example, hardware decoder mode execution typically will initiate immediately upon a miss at 404, such that steps 412, 414, 416 and 418 would occur in parallel with the hardware decoder processing of the missed branch target.

At any point during the processing described in method 400, the method may include maintaining the hardware redirection structure, as shown at 420. Maintaining the hardware redirector may include reading access bits at 422 and clearing the access bits at 424. Maintaining may further include, at 426, updating the entries in the hardware redirector based on the usage information, as determined with reference to the values of the access bits.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered or omitted without departing from the scope of the present disclosure. Further, it will be appreciated that the methods described herein may be performed using any suitable software and hardware including the specific examples described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A micro-processing system including a microprocessor and associated memory system, comprising:
   a hardware structure on a core of the microprocessor;
   a plurality of entries in the hardware structure, each entry being associated with a translation of a corresponding code portion, the translation being executable by the microprocessor in lieu of the corresponding code portion to achieve substantially equivalent functionality;
   a redirection array in the hardware structure that includes, for each entry, redirection information usable to cause execution to be redirected from the corresponding code portion to the translation for that corresponding code portion;
   a history data structure that tracks a history of a value of an access bit, wherein the history data structure has more entries than the hardware redirector and is analyzed to increase hit rate of the redirection array; and
   an access array in the hardware structure that includes usage information that varies in response to the entries being used to redirect execution, where specific entries are maintained within or evicted from the hardware structure based on the usage information for those entries.

2. The micro-processing system of claim 1, further comprising management software that repeatedly samples values in the access array and controls whether specific entries are maintained within or evicted from the hardware structure based on how frequently those entries were used to redirect execution to translations.

3. The micro-processing system of claim 1, further comprising management software that repeatedly samples values in the access array and controls whether specific entries are maintained within or evicted from the hardware structure based on how recently those entries were used to redirect execution to translations.

4. The micro-processing system of claim 1, further comprising management software that repeatedly samples values in the access array and controls whether specific entries are maintained within or evicted from the hardware structure based on how frequently and how recently those entries were used to redirect execution to translations.

5. The micro-processing system of claim 1, further comprising a hardware decoder on the core of the microprocessor, where if a selected code portion does not have an entry in the hardware structure, that selected code portion is executed by the microprocessor using the hardware decoder, and where if the selected code portion does have an entry in the hardware structure, its corresponding translation is executed by the microprocessor without using the hardware decoder.

6. The micro-processing system of claim 1, where the usage information in the access array includes, for each entry, an access bit which is a binary indication of whether or not the entry has been used to redirect execution to a translation.

7. The micro-processing system of claim 6, where the micro-processing system is operative to (1) set the access bits in the access array when their corresponding entries are used to redirect execution to translations; and (2) clear the access bits between times when they have been set.

8. The micro-processing system of claim 7, further comprising management software that repeatedly samples and clears the access bits to generate a history of access bit values over time, the management software being further operative to control whether a selected entry is maintained within or evicted from the hardware structure based on the history of the access bit associated with that entry.

9. The micro-processing system of claim 8, where the management software is operative to control whether the selected entry is maintained within or evicted from the hardware structure based on one or more of how recently and how frequently the entry is used to redirect execution to the associated translation, as reflected in the history of the access bit.

10. The micro-processing system of claim 1, where the usage information in the access array includes, for each entry, a count of how many times the entry has been used to redirect execution to a translation.

11. The micro-processing system of claim 1, where the usage information in the access array includes, for each entry, a time when the entry was used to redirect execution to a translation.

12. In a processing pipeline having a hardware decoder disposed on a core of a microprocessor, a method of alternatively processing in a translation mode that omits use of the hardware decoder, or in a hardware decoder mode that makes use of the hardware decoder, the method comprising:
    generating a plurality of translations, each translation being executable in the translation mode in lieu of executing a corresponding code portion in the hardware decoder mode, to achieve substantially equivalent functionality;
    inserting, into a hardware structure on the core of the microprocessor, a plurality of entries, where each entry (1) is associated with one of the translations and its corresponding code portion, (2) includes redirection information usable during a fetch operation to cause execution to be redirected to the associated translation from its corresponding code portion;
    inserting usage information into the hardware structure, where the usage information varies in response to the entries being used to redirect execution;
    inserting history information regarding a value of an access bit, wherein the history information has more entries than the usage information and is analyzed to increase hit rate of a redirection array; and
    maintaining or evicting specific entries from the hardware structure based on analysis of the usage information.

13. The method of claim 12, where maintaining or evicting specific entries from the hardware structure is performed based on how frequently those entries were used to redirect execution, as determined by the analysis of the usage information.

14. The method of claim 12, where maintaining or evicting specific entries from the hardware structure is performed based on how recently those entries were used to redirect execution, as determined by the analysis of the usage information.

15. The method of claim 12, where maintaining or evicting specific entries from the hardware structure is performed based on how frequently and how recently those entries were used to redirect execution, as determined by the analysis of the usage information.

16. The method of claim 12, where the usage information includes, for each entry in the hardware structure, an access bit which is a binary indication of whether the entry has been used to redirect execution.

17. The method of claim 16, further comprising repeatedly sampling and clearing the access bits to generate a history of access bit values over time for each entry, where maintaining or evicting specific entries from the hardware structure is based on analysis of the history of access bit values over time for those entries.

18. The method of claim 17, where the history of access bit values for each entry includes at least one of (1) how frequently the entry was used to redirect execution; (2) how recently the entry was used to redirect execution; (3) a count of how many times the entry was used to redirect execution; and (4) a time when the entry was used to redirect execution.

19. A micro-processing system including a microprocessor and associated memory system, comprising:
a hardware structure on a core of the microprocessor;
a plurality of entries in the hardware structure, each entry being associated with a translation of a corresponding code portion, the translation being generated by a dynamic binary translator and executable by the microprocessor in lieu of the corresponding code portion to achieve substantially equivalent functionality;
a redirection array in the hardware structure that includes, for each entry, redirection information usable during a fetch operation to cause execution to be redirected from the corresponding code portion to the translation for that corresponding code portion;
an access array in the hardware structure that includes, for each entry, an access bit which is a binary indication of whether the entry has been used to redirect execution to its translation;
a history data structure that tracks a history of a value of an access bit, wherein the history data structure has more entries than the access array and is analyzed to increase hit rate of the redirection array; and
management software that repeatedly samples and clears the access bits to generate, for each entry, a history of its access bit value over time, and controls whether specific entries are maintained within or evicted from the hardware structure based on the history of the access bit value for those entries.

20. The system of claim 19, where the management software controls whether specific entries are maintained within or evicted from the hardware structure based on at least one of how recently and how frequently those entries were used to redirect execution.

* * * * *